United States Patent [19]

Ichikawa et al.

[11] Patent Number: 4,821,102
[45] Date of Patent: Apr. 11, 1989

[54] VIDEO DISPLAY SYSTEM WITH SELECTIVE DISPLAY OF OPERATING CONDITIONS

[75] Inventors: Norihito Ichikawa; Osamu Oda, both of Tokyo; Toshio Amano, Kanagawa; Ikuo Someya, Tokyo, all of Japan

[73] Assignee: Sony Corporation, Tokyo, Japan

[21] Appl. No.: 79,152

[22] Filed: Jul. 29, 1987

[30] Foreign Application Priority Data

Jul. 29, 1986 [JP] Japan .................................. 61-178171

[51] Int. Cl.⁴ ...................... H04N 5/262; H04N 5/272
[52] U.S. Cl. ...................................... 358/183; 358/22; 358/142

[58] Field of Search ...................... 358/183, 22, 194.1, 358/142, 147

[56] References Cited

U.S. PATENT DOCUMENTS 4,633,297  12/1986  Skerlos .................. 358/183
4,675,736   6/1987  Lehmer .................. 358/183

Primary Examiner—Tommy P. Chin

[57] ABSTRACT

A video display system has a circuit for sequentially superimposing N (N≧2) information signals upon a video signal for display on the picture screen of a television receiver, at predetermined positions in parallel relation, and a circuit for changing the display positions so as to display information signals sequentially from a corner of the picture screen.

13 Claims, 7 Drawing Sheets

⇒ PRESS COUNTER KEY

COUNTER 1234 ⇒ AFTER 4 SECONDS

1234 ⇒ PRESS COUNTER KEY

⇒ PRESS CLOCK KEY

WED 10:30AM ⇒ AFTER 4 SECONDS

PRESS CLOCK KEY

10:30 ⇒ PRESS CLOCK KEY

⇒ PRESS VTR SLEEP KEY

0H30MTOGO THU 10:30 AM ⇒ AFTER 10 SECONDS

1234 ⇒ PRESS CLOCK KEY

1234 THU 10:30AM ⇒ AFTER 4 SECONDS 1234 10:30

PRESS COUNTER KEY FIG.9B  AFTER 4 SECONDS FIG.9C

PRESS CLOCK KEY FIG.10B

PRESS COUNTER KEY FIG.11B

PRESS VTR SLEEP KEY FIG.12B  AFTER 10 SECONDS FIG.12C

PRESS VTR SLEEP KEY

AFTER 10 SECONDS

PRESS VTR SLEEP KEY

AFTER 10 SECONDS

PRESS VTR SLEEP KEY

PRESS COUNTER KEY

AFTER 4 SECONDS SINCE COUNTER KEY WAS PRESSED

AFTER 10 SECONDS SINCE VTR SLEEP KEY WAS PRESSED

VIDEO DISPLAY SYSTEM WITH SELECTIVE DISPLAY OF OPERATING CONDITIONS

BACKGROUND OF THE INVENTION

1. Field of the Invention

The present invention relates generally to a video display system and, more particularly, to a video display system capable of superimposing various information signals, such as the operational mode of a video tape recorder, etc. upon an image displayed on the picture screen of a television receiver.

2. Background

A known television receiver having a built-in video tape recorder is arranged to incorporate a video tape recorder section into the housing of its television receiver section as one unit. This type of television receiver is capable of recording a television broadcast received at a tuner of the television receiver section on the tape of a video tape cassette loaded onto the video tape recorder section. It can also reproduce video information reproduced from the video tape on the picture screen of the television receiver section.

If the video tape recorder functions of recording and reproducing the video information are combined with the television receiver functions of receiving and reproducing a broadcast as described above, this combination of functions enables the circuit portions such as the tuner and so on to be commonly used, thus simplifying the overall arrangement of the combined system.

However, such a conventional television receiver having a built-in video tape recorder has the following defect. When a user inputs operation commands by using operation keys mounted on the television receiver section and the video tape recorder section, or the operation buttons of a remote commander or the like, this type of television receiver does not display whether or not it is operating properly in accordance with the desired mode of operation. This causes the user to feel very uncertain about whether his commands were correct or were properly executed.

In other words, because the television receiver and the video tape recorder are combined as one unit, the functions of the video tape recorder section, which has very complicated operations, are additively combined with the functions of the television receiver section. This combination of functions forces the user to perform relatively cumbersome operations. Also, it becomes very difficult for the user to understand and deliver the required commands for given operating conditions of the video tape recorder section and the television receiver section.

To remove these defects, the assignee of the present application has previously proposed a video display system which is disclosed, for example, in unpublished Japanese Patent Application No. 61-1877. There, a television receiver in which a television receiver section and a video tape recorder section are combined as one unit, has a video display system provided with control means for permitting a responsive operation display, which indicates how the video tape recorder is operated in response to the operation commands inputted by the user, and an operating situation display which indicates the operating state of the video tape recorder section, on the display screen of the television receiver section. Various information with respect to the responsive operations done by the video tape recorder section, when it is operated in response to the user's commands, are displayed together with operation information of the television receiver section by using the above mentioned picture display portion. Accordingly, this makes the television receiver having a built-in video tape recorder more useful and easier to handle on the whole.

However, when various information is displayed on the picture screen by the above mentioned video display system, the information hides the picture corresponding to video signals reproduced from the video tape recorder section or a video signal received at the tuner, so that the picture on the picture screen is made very difficult to see.

Specifically, the thus constructed television receiver having a built-in video tape recorder has to display a great quantity of information, such as, operation modes, tape speed, recording channel, count value of the video tape recorder, time, reception channel of the television receiver, the receiving conditions of sound multiplexed broadcast, etc., all as display information. Accordingly, to display all of this information on the picture screen occupies a large area of the picture screen, so the information displayed hides the picture of the picture screen and thus, the picture becomes very difficult to see.

OBJECTS AND SUMMARY OF THE INVENTION

Accordingly, it is an object of this invention to provide an improved video display system.

It is another object of this invention to provide a video display system by which various information can be superimposed upon the picture of a received video signal while the picture is displayed on the picture screen in the easiest form to see.

It is a further object of this invention to provide a video display system for use with a television receiver having a built-in video tape recorder in which a video tape recorder section and a television receiver section are combined as one unit.

According to one aspect of the present invention, there is provided a video display system comprising:

(a) means for sequentially superimposing N (N≧2) information signals upon the picture of a video signal displayed on a picture screen such that said N information signals are sequentially displayed at predetermined positions of said picture screen in parallel relation to one another; and (b) means for altering the display positions of the information signals is smaller than said N in such a manner that said display information is sequentially displayed from the corner of said picture screen.

These and other objections, features and advantages of the present invention will become apparent from the following detailed description of the preferred embodiment that is to be read in conjunction with the accompanying drawings, throughout which like reference numerals identify like elements and parts.

DESCRIPTION OF THE PREFERRED EMBODIMENT

Now, an embodiment of a video display system according to the present invention will hereinafter be described in detail with reference to the attached drawings.

Figure 1:
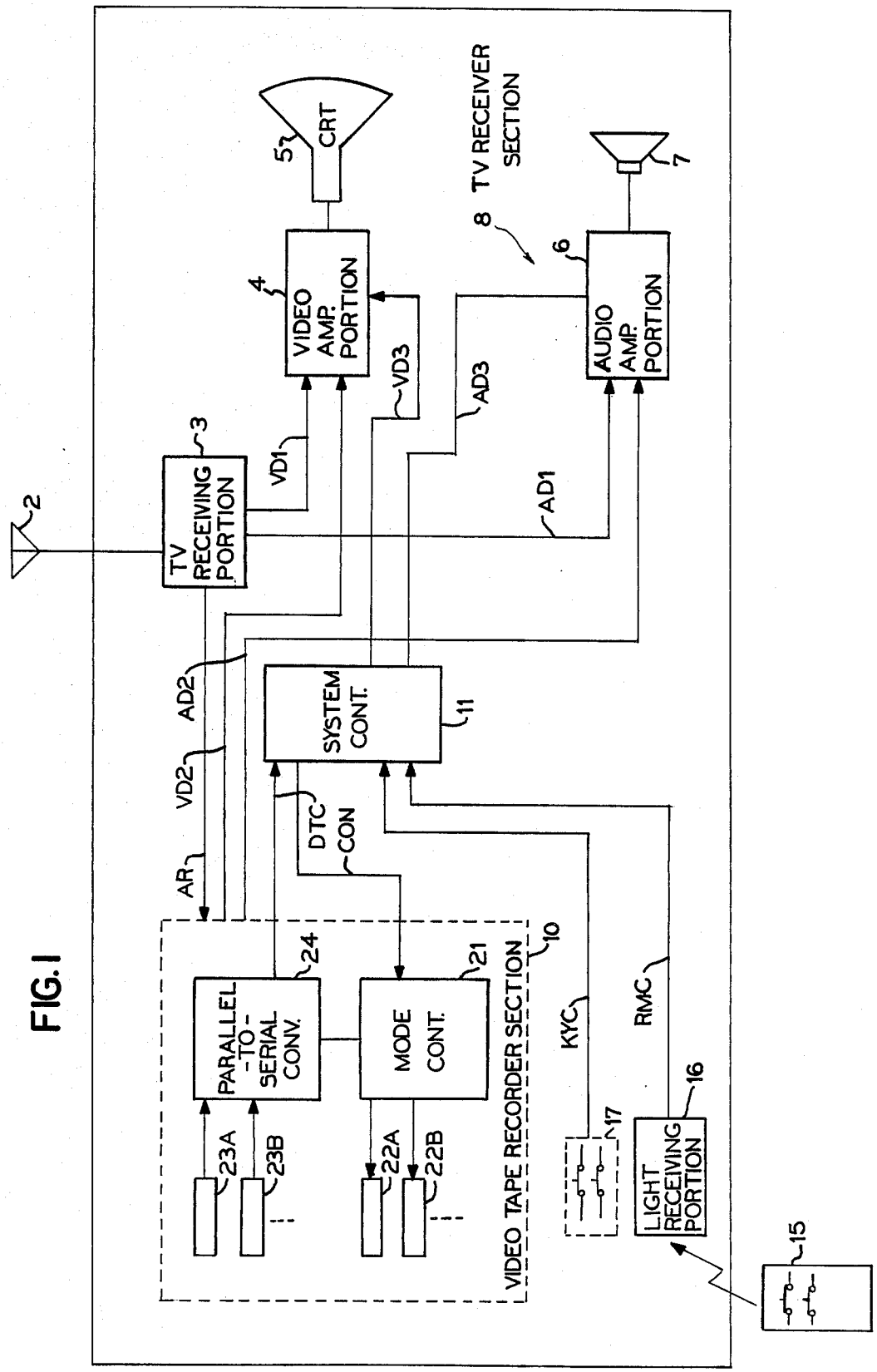
FIG. 1 is a block diagram showing an embodiment of a video display system according to the present invention.

FIG. 1 illustrates an arrangement of a television receiver 1 having an embodiment of a video display system according to the present invention. The television receiver 1 has a video tape recorder section 10 incorporated thereinto. A cathode ray tube (hereinafter referred to as a CRT) 5 of the television receiver 1 serves as a display portion of this video display system, and information is displayed on the picture screen of the CRT 5.

The arrangement of the television receiver 1 will be described hereinbelow.

In accordance with the television receiver 1 shown in FIG. 1, a television broadcast signal received at an antenna 2 is received by a television broadcast receiving portion 3. A video detected output signal VD1 from the receiving portion 3 is supplied through a video amplifying portion 4 to the CRT 5 forming the picture display portion and thereby displayed on the picture screen of the CRT 5. At the same time, an audio detected output signal AD1 from the receiving portion 3 is supplied through an audio amplifying portion 6 to a loudspeaker 7, from which sound is therefore emanated. Thus, these components make up a television receiver section 8.

A video information signal AR concerning the television broadcasting program received at the television broadcast receiving portion 3 is supplied, for example, to a video tape recorder section 10 and thereby recorded on a video tape of a video tape cassette (not shown) loaded onto the video tape recorder section 10. Upon playback, the video tape recorder section 10 is adapted to supply a reproduced video output signal VD2 played back from the video tape to the video amplifying portion 4 and also to supply a reproduced audio output signal AD2 to the audio amplifying portion 6 whereby to display a reproduced picture on the CRT 5 and to emanate a reproduced sound from the loudspeaker 7.

The television receiver 1 includes, in addition to the above mentioned circuit elements, a system control portion 11 formed of what may be called a system control IC (integrated circuit) which controls the television receiver 1 so as to operate in response to the user's commands.

The system control 11 includes a microprocessor for executing the necessary instructions, as well as a memory unit for storing the instructions and temporarily storing data input via the keyboard 17 or the remote commander 15.

The system control portion 11 receives a remote control signal RMC and a key control signal KYC as operation commands. The remote control signal RMC is generated from a remote commander 15, which will be described later, when the user operates the remote commander 15, and is supplied through a light receiving portion 16 to the system control portion 11. The key control signal KYC is generated from a key operation portion 17 which is mounted on the front of the housing of the television receiver 1.

The remote control signal RMC or the key control signal KYC supplies to the system control portion 11 information signals concerning the television receiver section 8, such as, a power on/off information signal, a channel selecting information signal, a sound volume adjusting information signal, a color adjusting information signal and so on. Also, the remote control signal RMC or the key control signal KYC supplies to the system control portion 11 signals to initiate various operation modes, such as, a recording mode (REC), a playback mode (PLAY), a fast forward mode (FF), a rewind mode (REW), an eject mode (EJECT), a stop mode (STOP), a pause mode (PAUSE), etc. and timer-activated operation modes, such as, a timer-activated playback mode, a timer-activated recording mode a timer sleep mode and so on as to the video tape recorder section 10.

In addition to the above mentioned arrangement, the system control portion 11 is adapted to supply a control information signal CON to a mode control portion 21 in the video tape recorder section 10 in response to the commands inputted by the user. Then, the mode control portion 21 places the video tape recorder section 10 into a predetermined operational mode by driving drive control mechanisms 22A, 22B, . . . for a motor and so on.

The video tape recorder section 10 includes sensor portions 23A, 23B, . . . to check its operational mode. The detected signals from the respective sensor portions 23A, 23B, . . . are supplied to a parallel-to-serial converting portion 24, in which they are converted to serial signals, which are then fed back to the system control portion 11 as operation detecting signals DTC. In this embodiment, the mode control portion 21 receives and supplies the information signals responsive to the control information signal CON through the parallel-to-serial converting circuit 24 to the system control portion 11 as the operation detecting signals DTC.

In this embodiment, the system control portion 11 supplies an operation display signal VD3 to the video amplifying portion 4, in response to the contents of the operation command designated by the remote control signal RMC or the key control signal KYC and in response to the operation detecting signal DTC indicating the operation state of the video deck or video tape recorder section 10. The above mentioned operation indicating signal VD3 is used to display, on the CRT 5, the contents of the operation command received by the television receiver 1, the responsive operation state of the television receiver 1 and the presence or absence of abnormalities by means of a symbol and/or a message.

Figure 2:
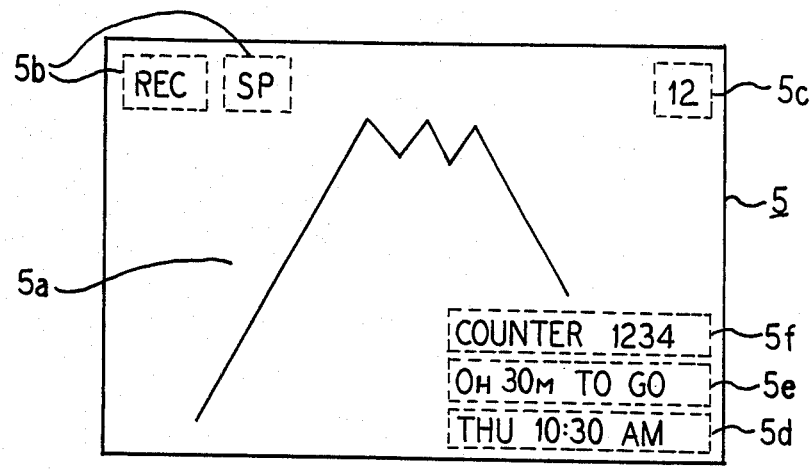
FIG. 2 is a diagram showing an example of a picture displayed on the picture screen by the video display system according to the embodiment of the invention.

As illustrated in FIG. 2, the video amplifying portion 4 allows the display on the CRT of a picture corresponding to the video detected output VD1 or the reproduced video output VD2 on a video display portion 5a of the CRT 5, and a VTR mode display portion 5b, a TV mode display portion 5c, with first, second and third present state display portions 5d, 5e and 5f superimposed upon the video display portion 5a of the CRT 5. The VTR mode display portion 5b displays the operation or the like based on the operation command applied to the video tape recorder section 10 at, for example, the upper left-hand corner of the picture screen or display portion 5a of the CRT 5; the TV mode display portion 5c displays the operation or the like based on the operation command applied to the television receiver section 8 at, for example, the upper right-hand corner of the picture screen 5a of the CRT 5; and the first, second and third present state display portions 5d, 5e and 5f display present states such as current time and so on at, for example, the lower right-hand corner of the picture screen 5a of the CRT 5. The respective present state display portions 5d, 5e and 5f are located in the sequential order of the first, second and third present state display portions 5d, 5e and 5f from the bottom of the picture screen 5a of the CRT 5.

In response to the operation modes of the video tape recorder section 10, the VTR mode display portion 5b displays, for example, "REC" indicating the recording mode, "TIMER REC" indicating the timer-activated recording mode, "PLAY" indicating the playback mode, "FF" indicating the fast forward mode, "REW" indicating the rewind mode, "AUTO REW" indicating the automatic rewind mode after the tape was transported to its tape end, "STOP" indicating the stop mode, "STANDBY" indicating the standby in timer-activated recording mode, "REC PAUSE" indicating the pause in the recording mode, "PLAY PAUSE" indicating the pause in the playback mode, "EJECT" indicating the ejection of the tape cassette, "AUTO EJECT" indicating that the tape cassette is automatically ejected when recording is attempted by mistake on a recording-inhibited tape, "EDIT PLAY" indicating the playback in the automatic edit mode, "EDIT FF" indicating the fast forward operation in the automatic edit mode, "EDIT REW" indicating the rewind operation in the automatic edit mode, and "INDEX SEARCH" indicating the index search operation. Also "SP" indicates a short play mode and "LP" indicates a long play mode.

The TV mode display portion 5c displays, for example, the reception channel and the switching state of main/subchannel of sound multiplexed broadcasting in the television receiver section 8.

The first, second and third present state display portions 5d, 5e and 5f are adapted to display the present time and day of the week, the setting state of the VTR-sleep-function and the count value of the tape running in the VTR, respectively. The VTR sleep function is adapted to determine the operation time of the video tape recorder section 10 and to enable the video tape recorder section 10 to carry out the reproduction or recording during the predetermined period of time. In this case, the VTR sleep function is displayed in the form of the time remaining for operation of the video tape recorder section 10. The above-mentioned information units are displayed respectively on the first, second and third present state display portions 5d, 5e and 5f by the key operation of the remote controller 15 through the system control portion 11.

The system control 11 preferably incorporates a microprocessor and a read-write memory for storing data such as, for example, command KYC and RMC received from the keyboard 17 and the remote commander 16. Operation of the microprocessor is controlled by a program stored in a read only memory, which causes the recognition of the commands KYC and RMC and the recognition of when a new key is pressed on either of the input units 16 and 17. A character generator associated with the microprocessor responds to data read out of the read-write memory corresponding to information signals to be superimposed in the video signals derived from the receiving portion 3 or from the VTR section 10, and the microprocessor controls the times of operation of character generator so that the appropriate information signals are produced for superimposition on the video signals at the correct time for display of the information signals at the appropriate location on the picture screen. For example, information signals to appear at the bottom of the screen must be produced later, during each raster, than signals appearing above or to the left of such signals, etc.

The control operation done by the system control portion 11 in response to the key operation will be described hereinafter. In this embodiment, the operation panel of the remote commander 15 is constructed as shown in FIG. 3.

Figure 3:
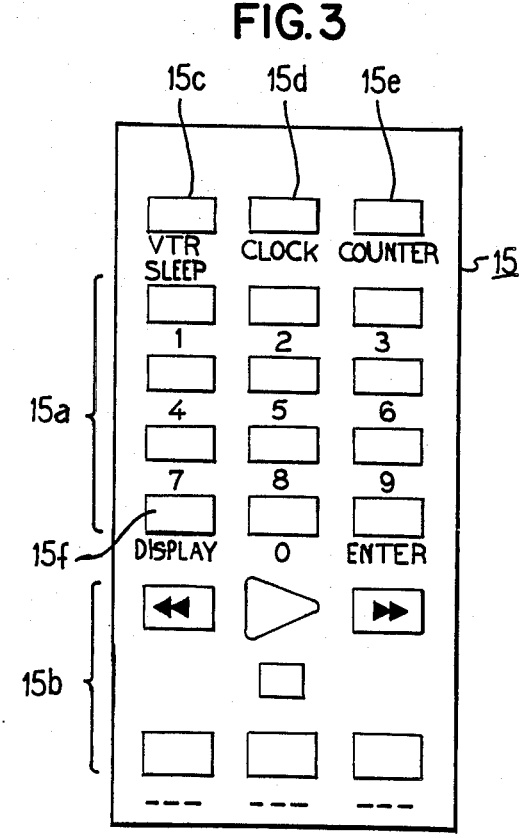
FIG. 3 is a plan view illustrating an example of a remote commander used in the embodiment of the invention.

Referring to FIG. 3, the remote commander 15 is provided with a ten-key portion 15a used to select the reception channel by the television broadcast receiving portion 3, a key portion 15b used to operate the transportation of the video tape in the video tape recorder section 10, a VTR sleep function setting key 15c, a clock key 15d used to display the present time, a counter key 15e used to display a count value and a display key 15f used to maintain the displayed state. Three keys, that is, the VTR sleep function setting key 15c, the clock key 15d and the counter key 15e are used to display the above mentioned information signals on the first, second and third present state display portions 5d, 5e and 5f. When three keys 15c, 15d and 15e are operated by the user, the system control portion 11 carries out the following control operations, which are represented in the flow chart in FIG. 4.

Figure 4:
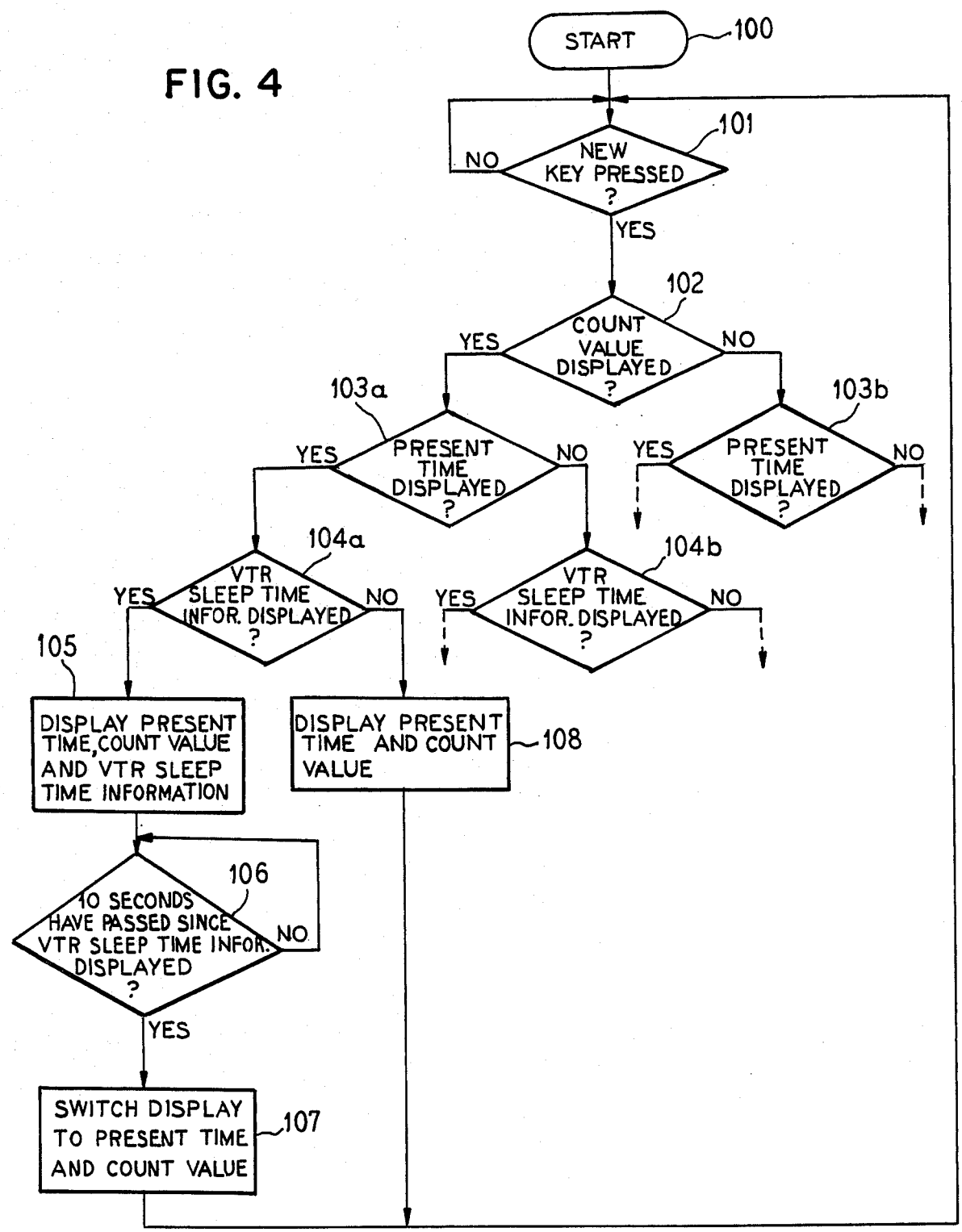
FIG. 4 is a flow chart to which reference will be made in explaining the operation of the video display system of the invention.

Referring to FIG. 4, the control operation of the system control portion 11 begins with step 100. The processing of the microcomputer (system control portion 11) goes from step 100 to step 101. It is checked, as represented at decisional step 101, whether any of the keys 15c, 15d and 15e is newly pressed or not. If any one of the keys is newly pressed, the system control 11 stores the new data and the processing goes to step 102.

If the count value is commanded to be displayed, or is already being displayed, in response to an appropriate command having been entered via FYC or RMC and stored in the memory of the system control 11, as determined at step 102, the processing goes to the next decisional step 103a. At decisional step 103a, it is checked whether the present time is to be displayed or not. If the present time is to be displayed, the processing goes to the next decisional step 104a. Then decisional step 104a checks whether the VTR sleep time information is to be displayed or not. If it is to be displayed, the processing goes to the next step 105, in which the present time, the count value and the VTR sleep time information are displayed, respectively. Then, the processing goes from step 105 to the next decisional step 106. Then, step 106 checks whether 10 seconds have passed or not since the VTR sleep time information was displayed. If 10 seconds have passed, the processing goes to step 107, in which the displayed state is switched to the display of the present time and the count value. Then, processing goes back to step 101. If 10 seconds have not passed yet, the processing is repeatedly executed at step 106 until 10 seconds are passed.

If the VTR sleep time information is not displayed as represented at decisional step 104a, the processing goes to step 108, in which the present time and the count value are displayed. Then, the processing goes back from step 108 to step 101.

Other steps following the steps 103b and 104b are indicated generally but not shown specifically in FIG. 4, because they are similar to the steps already shown and described above.

If the decisional step 103a determines that the present time is not to be displayed, then a check is made in step 104b as to whether the sleep time information is to be displayed. If so, control passes to a step (not shown) like the step 105, but which is operative to display only the count value and the sleep time information. Then step 106 is executed, after which a step like step 107 restores the display to show the count value only, and returns to step 101. If the step 104b determines that sleep time is not to be displayed, then a step like step 105 is performed, except that only the count value is displayed, after which control returns to step 101.

If the decisional unit 102 determines that the count value is not to be displayed, then step 103b is performed. Following step 103b, if the present times is to be displayed, a check is made (like step 104a) to determine whether sleep time is to be displayed, and if so, a step (not shown) like step 105 is performed except that the counter value is not displayed. Then steps similar to 106 and 107 are performed to omit the display of the sleep time after 10 seconds and display only present time. Control then returns to step 101.

When step 103b determines that present time is not to be displayed, then only the sleep time is displayed in a step like step 105 (not shown) and after 10 seconds the display of the sleep time is erased.

When three information signals are displayed on the first, second and third present state display portions 5d, 5e and 5f, the order of priority for such displays is predetermined by the system control portion 11. For example, one information signal is displayed by only the first present state display portion 5d; two information signals are displayed on the first and second present state display portions 5d and 5e; and three information signals are displayed by all of the first, second and third present state display portions 5d, 5e and 5f. Further, the present time, the VTR sleep function and the count value are also displayed in the order of priority predetermined by the system control portion 11. For example, a plurality of information signals are displayed in the order of priority of (1) the present time, (2) the VTR sleep function and (3) the count value from the bottom of the picture screen of the CRT 5 (from the side of the first present state display portion 5d). The microprocessor within the control unit 11 controls the timing of production of signals from the character generator so that the first position is always occupied when one or more information signals are displayed and the third position is never occupied unless three information signals are displayed. The contents of the displayed information signals are illustrated concretely in FIG. 2.

Referring to FIG. 2, the first present state display portion 5d displays the clock, that is, 10:30 A.M. on Thursday as "THU 10:30 AM". The second present state display portion 5e displays that the VTR sleep function is effected for 30 minutes as "$0_H 30_M$ TO GO". The third present state display portion 5f displays that the count value of the tape running amount is 1234 as "COUNTER 1234". Then, under the control of the system control portion 11, after 4 seconds have passed since the display of the clock was started, only "10:30" without "THU" and "AM" is displayed on the first present state display portion 5d. After 10 seconds have passed since the display of the VTR sleep function was displayed, this VTR sleep function "$0_H 30_M$ TO GO" is erased from the second present state display portion 5e. After 4 seconds have passed since the display of the count value was started, only "1234" without "COUNTER" is displayed on the third present state display portion 5f.

When the information signals are displayed by the thus constructed video display system of this embodiment, the displayed state oft he information is changed on the picture screen, by way of example, as follows. In this case, the video display system is operated by pressing the keys on the remote commander 15 (FIGS. 1 and 3).

Figure 5A:
FIGS. 5A to 15E are schematic representations respectively illustrating examples of pictures displayed on the picture screen according to the embodiment of the invention.
Figure 5B:
Figure 5C:
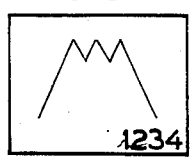
Figure 5D:
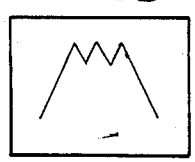

To display the count value, the counter key 15e is pressed during the state at first in which no information is displayed on the picture screen as shown in FIG. 5A. Then, the count value such as "COUNTER 1234" or the like is displayed on the first present state display portion 5d as represented in FIG. 5B. After 4 seconds have passed since the counter key 15e was pressed, only "1234" is displayed thereon as shown in FIG. 5C. The display of "1234" is erased by pressing the counter key 15e again as represented in FIG. 5D.

Figure 6A:
Figure 6B:
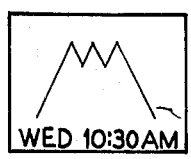
Figure 6C:
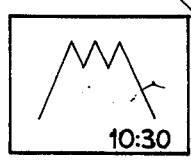
Figure 6D:
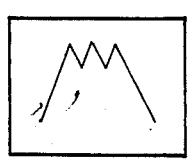

To display the present time at first, the clock key 15d is pressed during the state in which no information is displayed as shown in FIG. 6A. Then, the present time such as "WED 10:30 AM" is displayed on the first present state display portion 5d, as represented in FIG. 6B. After 4 seconds have passed since the clock key 15d was pressed, only "10:30" is automatically displayed thereon as shown in FIG. 6C. The display of "10:30" is erased by pressing the clock key 15d again, as represented in FIG. 6D. The initial state in which no information is displayed is also brought about by pressing the clock key 15d even before 4 seconds have passed.

Figure 7A:
Figure 7B:
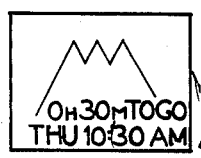
Figure 7C:

To display the VTR sleep time information at first, the VTR sleep key 15c is pressed during the state in which no information is displayed as shown in FIG. 7A. Then, the present time, that is, "THU 10:30 AM" is displayed on the first present state display portion 5d and the sleep time information such as $0_H 30_M$ TO GO" is displayed on the second present state display portion 5e, as represented in FIG. 7B. After 10 seconds have passed since the VTR sleep key 15c was pressed, the initial state in which no information is displayed is automatically returned to, as represented in FIG. 7C.

Figure 8A:
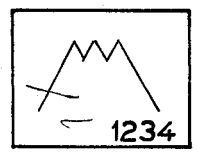
Figure 8B:
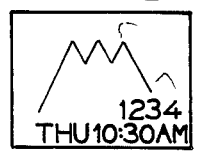
Figure 8C:
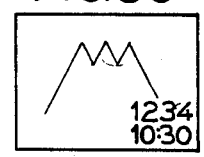

To display the present time during the state in which the count value is already displayed on the first present state display portion 5D as illustrated in FIG. 8A, the clock key 15d is pressed. Then, the time such as "THU 10:30 AM" is displayed on the first present state display portion 5d. At the same time, the display of the count value is shifted to the second present state display portion 5e and the count value "1234" is displayed thereon as represented in FIG. 8B. After 4 seconds have passed since the clock key 15d was pressed, the time display is automatically changed to the display of only "10:30", as represented in FIG. 8C.

Figure 9A:
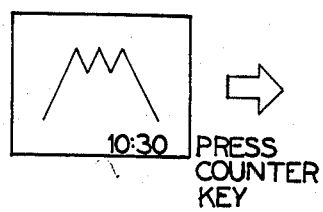
Figure 9A:
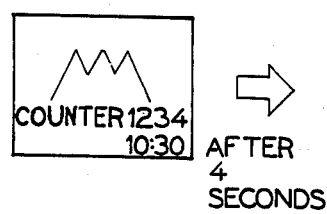
Figure 9A:
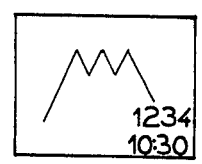

To display the count value during the state in which the present time "10:30" is displayed on the first present state display portion 5d as illustrated in FIG. 9A, the counter key 15e is pressed. Then, the count value such as "COUNTER 1234" is displayed on the second present state display portion 5e, as represented in FIG. 9B. At this time, the first display portion 5d still displays the present time "10:30". After 4 seconds have passed since the counter key 15e was pressed, the display of the count value is automatically changed to the display of only "1234" as represented in FIG. 9C.

Figure 10A:
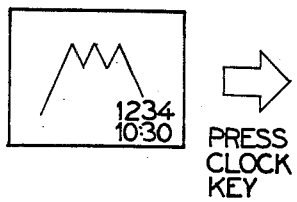
Figure 10A:

To erase the present time from the state in which the present time, "10:30" and the count value "1234" are displayed respectively on the first and second present state display portions 5d and 5e as shown in FIG. 10A, the clock key 15d is pressed. Then, only the count value "1234" is displayed as represented in FIG. 10B. At that time, the display position of the count value is shifted from the second present state display portion 5e to the first present state display portion 5d.

Figure 11A:
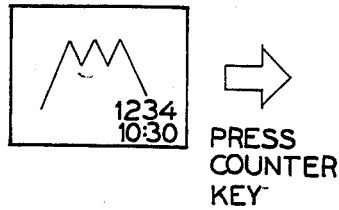
Figure 11A:
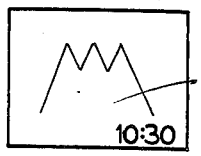

Further, to erase the display of the count value from the state in which the present time, "10:30" and the count value "1234" are similarly displayed on the first and second present state display portions 5d and 53 as shown in FIG. 11A, the counter key 15e is pressed. Then, only the present time, "10:30" is displayed on the first present state display portion 5d as represented in FIG. 11B. At that time, only the display of the count value, "1234" is erased from the second present state display portion 5e and the display position of the present time is not shifted.

Figure 12A:
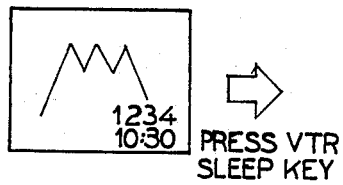
Figure 12A:
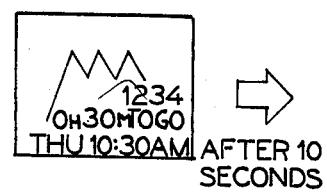
Figure 12A:
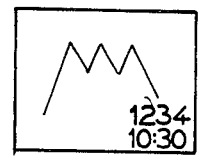

To display the VTR sleep time information during the state that the present time, "10:30" and the count value, "1234" are displayed on the first and second present state display portions 5 and 5e as shown in FIG. 12A, the VTR sleep key 15c is pressed. Then, the VTR sleep time information such as "$0_H 30_M$ TO GO" is displayed additively to the display of the present time and the display of the count value, as represented in FIG. 12B. If the present time is displayed only by numerals such as "1234", the day of the week and AM or PM are displayed together. At that time, the present time, the VTR sleep time information and the count value are sequentially displayed on the first, second and third present state display portions 5d, 5e and 5f, respectively. After 10 seconds have passed since the VTR sleep key 15c was pressed, the initial displayed state is returned to, in which the present time and the count value are displayed respectively on the first and second present state display portions 5d and 5e, as represented in FIG. 12C.

Figure 13A:
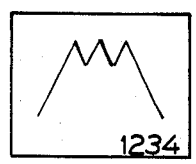
Figure 13B:
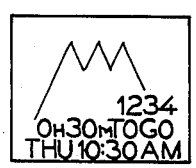
Figure 13C:
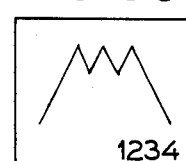

To display the VTR sleep time information during the state in which the count value is displayed on the first present state display portion 5d as shown in FIG. 13A, the VTR sleep key 15c is pressed. Then, the VTR sleep time information and the present time are displayed additively to the display of the count value as represented in FIG. 13B. At that time, the present time is displayed on the first present state display portion 5d; the VTR sleep time information is displayed on the second present state display portion 5e; and the count value is displayed on the third present state display portion 5f, respectively. After 10 seconds have passed since the VTR sleep key 15c was pressed, the same initial display state in which only the count value is displayed is returned to, as represented in FIG. 13C.

Figure 14A:
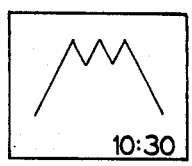
Figure 14B:
Figure 14C:
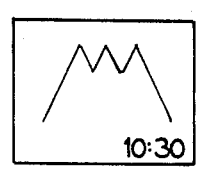

To display the VTR sleep time information during the state that present time is displayed on the first present state display portion 5d as illustrated in FIG. 14A, the VTR sleep key 15c is pressed. Then, the VTR sleep time information is displayed in the form of being added to the display of present time, as represented in FIG. 14B. At that time, the present time is displayed on the first present state display portion 5d and the VTR sleep time information is displayed on the second present state display portion 5e. After 10 seconds have passed since the VTR sleep key 15c was pressed, the initial display state in which the present time is displayed is returned to, as represented in FIG. 14C.

Figure 15A:
Figure 15B:
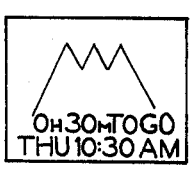
Figure 15C:
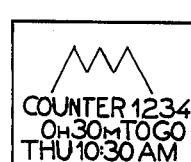
Figure 15D:
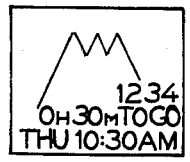
Figure 15E:

In order to display the count value immediately after the VTR sleep time information and the present time are displayed (as represented in FIG. 15B) is pressed. Then, the count value is displayed in the form of being added to the display of the VTR sleep time information and the display of the present time, as represented in FIG. 15C. At that time, the present time is displayed on the first present state display portion 5d; the VTR sleep time information is displayed on the second present state display portion 5e; and the count value is displayed on the third present state display portion 5f. After 4 seconds have passed since the counter key 15e was pressed, the display of the count value "COUNTER 1234" is changed to the display of only numerals ("1234"), as represented in FIG. 15D. Further, after 10 seconds have passed since the VTR sleep key 15c was pressed, only the count value "1234" remains displayed as shown in FIG. 15E.

As will be clear from the above mentioned display examples, the information signals are displayed on the respective present state display portions 5d, 5e and 5f of the picture screen of the CRT 5 of the television receiver 1 according to this embodiment in the following manner. That is, one display information signal is displayed on the first present state display portion 5d located at the lowermost position from the bottom of the picture screen; two display information signals are displayed on the first and second present state display portions 5d and 5e located at the lowermost position and the next position; and three display information signals are displayed sequentially on the first, second and third present state display portions 5d, 5e and 5f, respectively. For this reason, display information signals are displayed from the corner of the picture screen, in their order of priority depending upon the number of information signals being displayed. As a result, the display information is never displayed, for example, on only the third present state display portion 5f which is located near the center of the picture screen. Thus, the display information is always displayed at the corner portion of the picture screen so as not to disturb the picture of the received television broadcasting or the picture reproduced from the video tape.

Further, since the VTR sleep time information, which need not be displayed continuously, is displayed for only 10 seconds, the display of this VTR sleep time information disturbs the picture reproduced on the picture screen only during this short period of time.

Furthermore, since the characters such as day of the week, etc. in the display of the present time and the count value are displayed for only 4 seconds and only the minimum numerals are displayed thereafter, the picture reproduced on the picture screen can be most effectively be left undisturbed or hidden by the display of the informations, from this standpoint, as much as possible. Accordingly, when watching the picture screen of the CRT 5, the user can observe sufficient information at that location and understand with confidence the operational mode that the video tape recorder section 10 is now performing. Also, the picture reproduced on the picture screen of the CRT 5 becomes easier to see.

Figure 16:
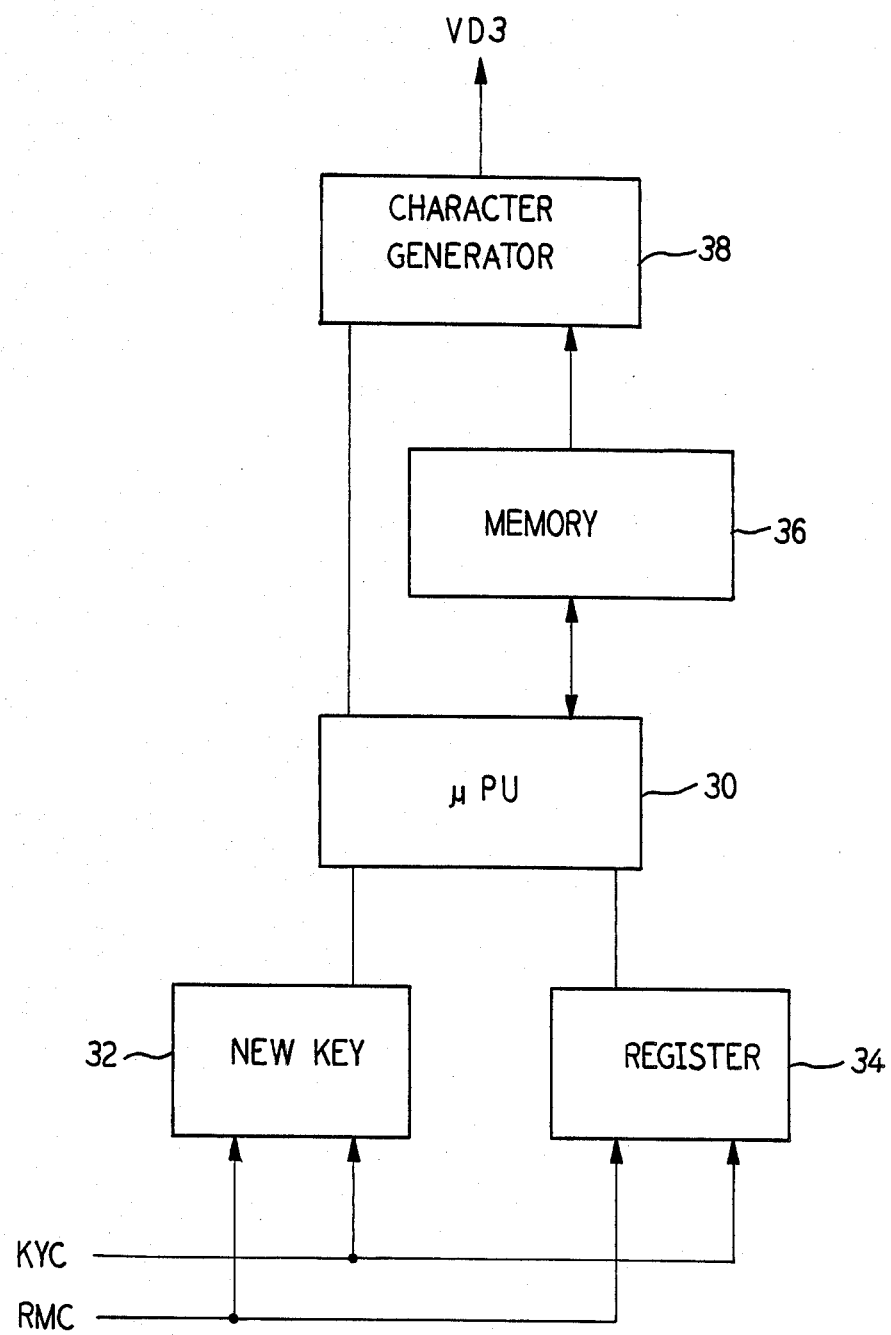
FIG. 16 is a functional block diagram of a system controller used with the invention.

Referring now to FIG. 16, a functional block diagram of the system control portion 11 is illustrated, incorporating a microprocessing unit 30.

It will be apparent to those skilled in the art that the microprocessor 30 within the system control portion 11 may readily be programmed to perform the steps as illustrated in FIGS. 4–15E. Therefore such programming need not be discussed in detail. A unit 32 detects a new key when it is pressed, as indicated by signals in KYC or RMC, and the new key data is available to the microprocessor in a register 34. The memory 36, associated with the microprocessor, is updated to incorporate the data represented by the new key which is depressed, and then the microprocessor determines what information signals are to be displayed in response to the updated data stored in the memory, following the steps illustrated in FIG. 4. A timing loop like step 106 may be entered by the microprocessor to establish both the 10 second and 4 second intervals which are required. Appropriate signals are then supplied to a character generator 38 from the microprocessor, and from the memory 36, to cause production of video signals to be superimposed via the line VD3, at the appropriate times, on the main video signal supplied to the video amplifier portion 4.

While the system control portion 11 for controlling the display of various information signals is provided within the television receiver 1 outside the video tape recorder section 10 as described above, a display signal generator may instead be provided within the video tape recorder section 10 and display information may be displayed by using the output signal from this display signal generator.

According to the above mentioned video display system of this invention, the display information signals, regardless of their number, are displayed at the position near the corner of the picture screen so as to most effectively prevent the picture of the received video signal from being disturbed. Accordingly, various information signals are displayed with good visability on the picture screen while the picture of the received video signal or the like is in the easiest form to see.

The above description is given on a single preferred embodiment of the invention but it will be apparent that many modifications and variations could be effected by one skilled in the art without departing from the spirit or scope of the novel concepts of the invention, so that the scope of the invention should be determined by the appended claims only.

We claim as our invention:

1. A video display system having a picture screen, adapted to display a picture corresponding to a video signal and system control means for controlling said system, said system control comprising, in combination:
    (a) means for generating plural condition information signals, each corresponding to an operating condition of said system;
    (b) superimposing means for sequentially superimposing up to N (N≧2) of said condition information signals upon said picture of said video signal displayed on said picture screen such that said N information signals are sequentially displayed so as to be simultaneously visable at predetermined positions of said picture screen in parallel relation to one another; and
    (c) position control means connected to said system control means for altering the display positions of certain ones of said N condition information signals if the number of display information signals is smaller than N, whereby said certain ones of said N display information signals is displayed in the spaced immediately adjacent a corner of said picture screen.

2. A video display system according to claim 1, wherein said position control means includes means for selecting said display positions, whereby when said N display information signals are all displayed on said picture screen, said N information signals are each displayed at predetermined positions of said picture screen, respectively.

3. A video display system according to claim 1, wherein said position control means includes means for selecting said display positions whereby when other information is additively displayed on said picture screen during the state in which one information signal is displayed, both information signals are displayed on said picture screen at predetermined positions.

4. A video display system according to claim 1, having a built-in video tape recorder with a clock and a timer for stopping a given operation of said system after a preset interval of sleep time, said system control means being connected to receive signals from said video tape recorder, said clock and said timer, whereby when there are 3 display information signals, said display information signals correspond to a tape count value, a sleep time value corresponding to remaining sleep time and a present time.

5. A video display system according to claim 4, wherein said three display information signals are displayed from the corner of said picture screen in the sequential order of said present time, said sleep time value information signal and said tape count value.

6. A method of displaying a plurality of condition information signals on a video system incorporating a viewing screen for displaying a picture corresponding to a video signal upon which are superimposed a plurality of images corresponding to said information signals, comprising the steps of;
    determining from input commands the condition information signals to be displayed, corresponding to predetermined operation conditions of said video system;
    displaying an image corresponding to one of the information signals to be displayed at a first location in a corner of said viewing screen, and
    displaying images corresponding to all others of said information signals to be displayed at locations adjacent to and in parallel with said first location.

7. The method according to claim 6, including the steps of;
    displaying information signals at said first location whenever one or more of said information signals are to be displayed, and
    displaying information signals at a nonadjacent location spaced from said first location only when at least three of said information signals are to be displayed.

8. The method according to claim 6, including the steps of;
    displaying a first information signal at said first location when said first information signal is to be displayed,
    displaying a second information signal at said first location when said first information signal is not to be displayed and otherwise displaying said second information signal at a second location adjacent o said first location, and
    displaying a third information signal at a third location adjacent to said second location when both said first and second information signals are to be displayed and at said second location when only one of said first and second signals are to be displayed and otherwise at said first location.

9. The method according to claim 6, wherein said video system includes a video tape recorder with a clock and a timer for stopping a given operation of said system after a preset interval of sleep time, including the steps of displaying information signals corresponding to a tape count value, a value corresponding to remaining sleep time and a present time.

10. The method according to claim 9, wherein said information signals are displayed in adjacent locations in the order, beginning with said first location, of said present time, said remaining sleep time and said tape count value.

11. The method according to claim 10, including the steps of initially displaying an image corresponding to said count value information signal including text and numbers and, after a predetermined interval, displaying an image with said numbers only.

12. The method according to claim 10, including the steps of initially displaying an image corresponding to said present time information signal including text and numbers and, after a predetermined interval, displaying an image which is composed of only said numbers and a symbol.

13. The method according to claim 10, including the steps of initially displaying an image corresponding to said remaining sleep time including text and numbers designating the remaining time and the present time and, after a predetermined interval, ending the display of said remaining time and ending the display of said present time unless said present time was already being displayed, and in that case displaying an image corresponding to said present time which is composed of only said numbers and a symbol.

* * * * *